(12) United States Patent
Graham

(10) Patent No.: US 6,424,125 B1
(45) Date of Patent: Jul. 23, 2002

(54) CAPACITOR DISCHARGING CIRCUIT

(75) Inventor: Martin H. Graham, Berkeley, CA (US)

(73) Assignee: And Yet, Inc., Berkeley, CA (US)

( * ) Notice: Subject to any disclaimer, the term of this patent is extended or adjusted under 35 U.S.C. 154(b) by 0 days.

(21) Appl. No.: 09/975,888

(22) Filed: Oct. 11, 2001

(51) Int. Cl.⁷ .............................................. H01M 10/46
(52) U.S. Cl. ...................................................... 320/166
(58) Field of Search ................................ 320/127, 128, 320/135, 166, 167

(56) References Cited

U.S. PATENT DOCUMENTS 3,737,793 A  *  6/1973  Buch et al.
4,556,864 A  *  12/1985  Roy
4,697,134 A  *  9/1987  Burkum et al.
5,003,195 A  *  3/1991  Stelling et al.
6,234,108 B1    5/2001  Graham

OTHER PUBLICATIONS

Graham, Martin, "A Ubiquitous Pollutant," Memo No. UCB/ERL M00/55, Oct. 28, 2000, 8 pages.
Olson, Matt," A Real Shocker, Is electricity making people sick?" ISTHMUS, May 18, 2001, thedailypage.com, Madison, WI., pp. 14–16.

* cited by examiner

Primary Examiner—Edward H. Tso
(74) Attorney, Agent, or Firm—Blakely, Sokoloff, Taylor & Zafman LLP

(57) ABSTRACT

A capacitor discharging circuit for discharging a potential on a capacitor when the capacitor is decoupled from an AC source. This circuit is particularly useful where the capacitor is unplugged from an ordinary AC power socket.

12 Claims, 3 Drawing Sheets

CAPACITOR DISCHARGING CIRCUIT

BACKGROUND OF THE INVENTION

1. Field of the Invention

The invention relates to the field of discharging capacitors, particularly where the charge remaining on the capacitor could have safety implications.

2. Prior Art

Often in homes and businesses, the power line voltage contains numerous high-frequency components not associated with, for instance, the 60 Hz alternating current (AC power) or its harmonics. These high-frequency components are caused, for example, by switched power supplies, dimmers, motors, and other sources. There are numerous good reasons why these high-frequency components are undesirable and should preferably be removed from the power line.

One way of reducing the high-frequency components is to connect a capacitor across the power line to shunt out the high-frequency components. An ordinary plug may be used to connect the capacitor to the power line at a power receptacle. This is convenient since it does not require the permanent or hard-wiring of the capacitor into the power circuit. When the capacitor is unplugged, a charge will typically remain on the capacitor and can cause a shock if, for example, a hand comes in contact with the prongs of the plug.

As will be seen, the present invention provides a circuit for discharging the capacitor once it is unplugged from the power line.

A circuit similar in structure, but not function, to the circuit of FIG. 1 is sometimes used in AC dimmers. In the dimmer application, the AC signal is phase shifted through a variable resistor and used to trigger a triac. As will be seen with the present invention, the circuit of FIG. 1 is triggered only with DC signals and is used to discharge a capacitor, not to control an AC signal for a light, or the like.

SUMMARY OF THE INVENTION

A method and apparatus for discharging a capacitor when the capacitor is unplugged from an AC receptacle is described. An attenuation circuit provides attenuation for the AC power signal and substantially less attenuation to a DC signal. When connected to the AC power line, the output of this circuit is low enough to not cause triggering of a triac since the output remains lower than a predetermined threshold voltage. However, when the capacitor is disconnected, the full DC potential remaining on the capacitor is coupled to a triggering mechanism for a triac. A discharge circuit, which includes the triac, causes the capacitor to be discharged when the DC signal is greater than the predetermined voltage.

DETAILED DESCRIPTION

A method and apparatus is described for discharging a capacitor after it has been disconnected from an alternating current (AC) power line. In the following description, numerous specific details are set forth, such as specific component values, in order to provide a thorough understanding of the present invention. It will be apparent to one skilled in the art that the present invention may be practiced without these specific details.

Figure 1:
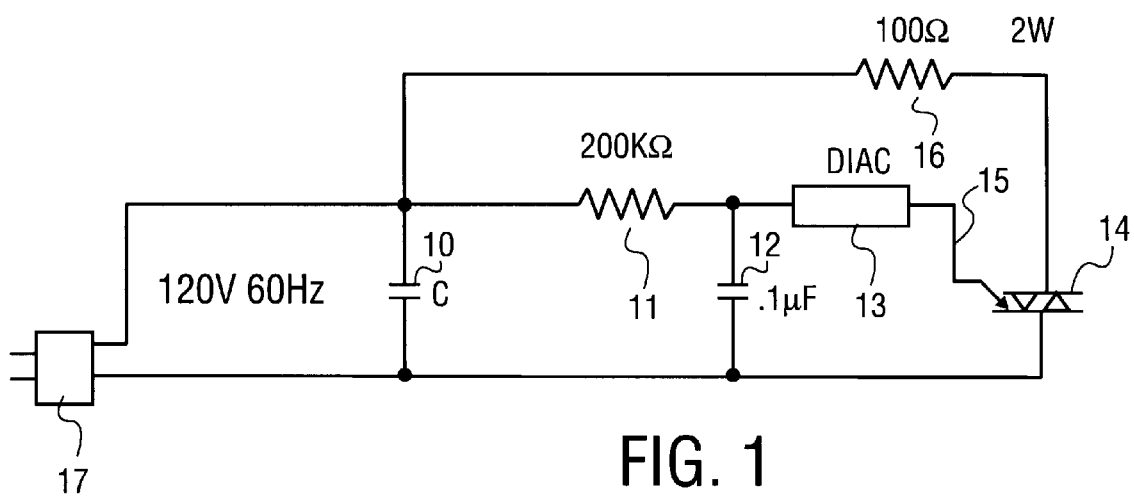
FIG. 1 is an electrical schematic showing a filtering capacitor in an embodiment of the invented circuit.

Referring now to FIG. 1, a capacitor 10 is illustrated which in connected directly to a AC power line such as a standard 120V 60 Hz power receptacle or socket through the plug 17. The capacitor 10 may be directly connected to the power line with an ordinary 2-prong or 3-prong plug commonly used in home and business applications for 120V AC. The function of the capacitor 10 is to filter out high-frequency signals that are often found on the power line. These signals are typically noise from numerous sources such as power supplies, dimmers, appliances, etc., and not typically harmonics associated with a 60 Hz power generation. Often the noise is above 10 kHz and can have a magnitude of $\frac{1}{10}$ volt (rms). The filtering capacitor 10, in one embodiment, has a capacitance of 85 $\mu$F and is able to withstand a voltage of 220V AC.

In an application where there are two phases of the AC power as often is the case, two capacitors are used, including two circuits such as shown in FIG. 1, one being connected to each of the phases.

The circuit of FIG. 1 includes an attenuation circuit comprising the resistor 11 and the capacitor 12 coupled to the capacitor 10. For 60 Hz, the values for the resistor 11 and capacitor 12 are selected such that the AC signal present at the capacitor 12 remains below a predetermined threshold voltage (e.g. 30 volts). For instance, if the resistor 11 is 200 K ohms and the capacitor is 0.1 $\mu$F at 60 Hz slightly more than ten percent (10%) of the signal across the capacitor 10 is present over the capacitor 12. Thus, even if the peak AC power reaches 180V, only approximately 18V of the AC signal appears across the capacitor 12.

The attenuation circuit could be realized using an inductor and resistor or a combination of an inductor, capacitor and resistor. However, these embodiments are not preferred since the inductor required would be larger and more costly than the capacitor 12 and the resistor 11 of FIG. 1.

Figure 2:
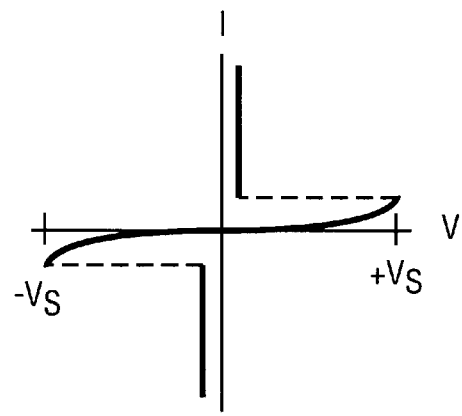
FIG. 2 is a graph used to describe the characteristics of a Diac used in the circuit of FIG. 1.

The Diac 13 comprises bilateral snap action diodes the characteristics of which are shown in FIG. 2. In one embodiment, the positive and negative potential Vs is equal to 30V. The diodes 13 connect the potential across the capacitor 12 through the triac control line 15 to a triac 14. Thus, when the potential on the capacitor 12 reaches or exceeds 30V for one embodiment (the predetermined threshold voltage) the triac is turned-on. The current through the Diac 13 is sufficient to trigger the triac. The diode 13 and triac 14 may be purchased as a single component referred to as a quadrac and in one embodiment, a 4 amp-200V quadrac is used specifically part number Q2004LT from Teccor Electronics.

The triac 14 is coupled in series with the resistor 16 and the capacitor 10. When the triac conducts, the charge on the capacitor 10 is dissipated in the resistor 16. Once the charge is dissipated from capacitor 12, the triac turns-off.

Since Vs for the snap action Diac 13 establish a threshold voltage of 30V for one embodiment, the triac 14 will not conduct until the potential on the capacitor 12 reaches 30V. The attenuation provided by the resistor 11 and the capacitor 12 prevents the potential on the capacitor 12 for an AC signal of 120V from ever reaching 30V, as mentioned. However, when the plug is removed from the socket, the charge remaining on capacitor 10 charges capacitor 12 through the resistor 11. The charge on capacitor 10 from the standpoint of the current produced through resistor 11 and onto capacitor 12 is a direct current (DC) signal. This signal is not attenuated as was the AC signal, that is, the potential on capacitor 12 rises to the same potential as on the capacitor 10 when the plug is removed. (Note in one embodiment capacitor 10 is 850 times larger than capacitor 12, therefore, very little of the total charge on capacitor 10 is needed to charge capacitor 12).

The potential on capacitor 10 when the plug is removed from the receptacle may take any value from plus or minus the peak AC value. Only if this value is 30V or greater will the triac 14 conduct since this is the threshold voltage for the Diac 13 for the described embodiment. A 30V potential, however, is low enough that it will not harm a human if it remains on the capacitor 10.

The RC time constant for resistor 11 and capacitor 12 is 20 milliseconds in one embodiment, thus the potential on capacitor 12 rises quickly to the voltage level of capacitor 10. The RC time constant for the capacitor 10 and resistor 16 allows the charge on the capacitor 10 to be-dissipated in less than 10 milliseconds. Thus, as a plug, is removed from a socket, the charge on the capacitor will be dissipated so rapidly that it will be practically impossible for a shock to be felt from the prongs of the plug connected to the capacitor 10.

Figure 3:
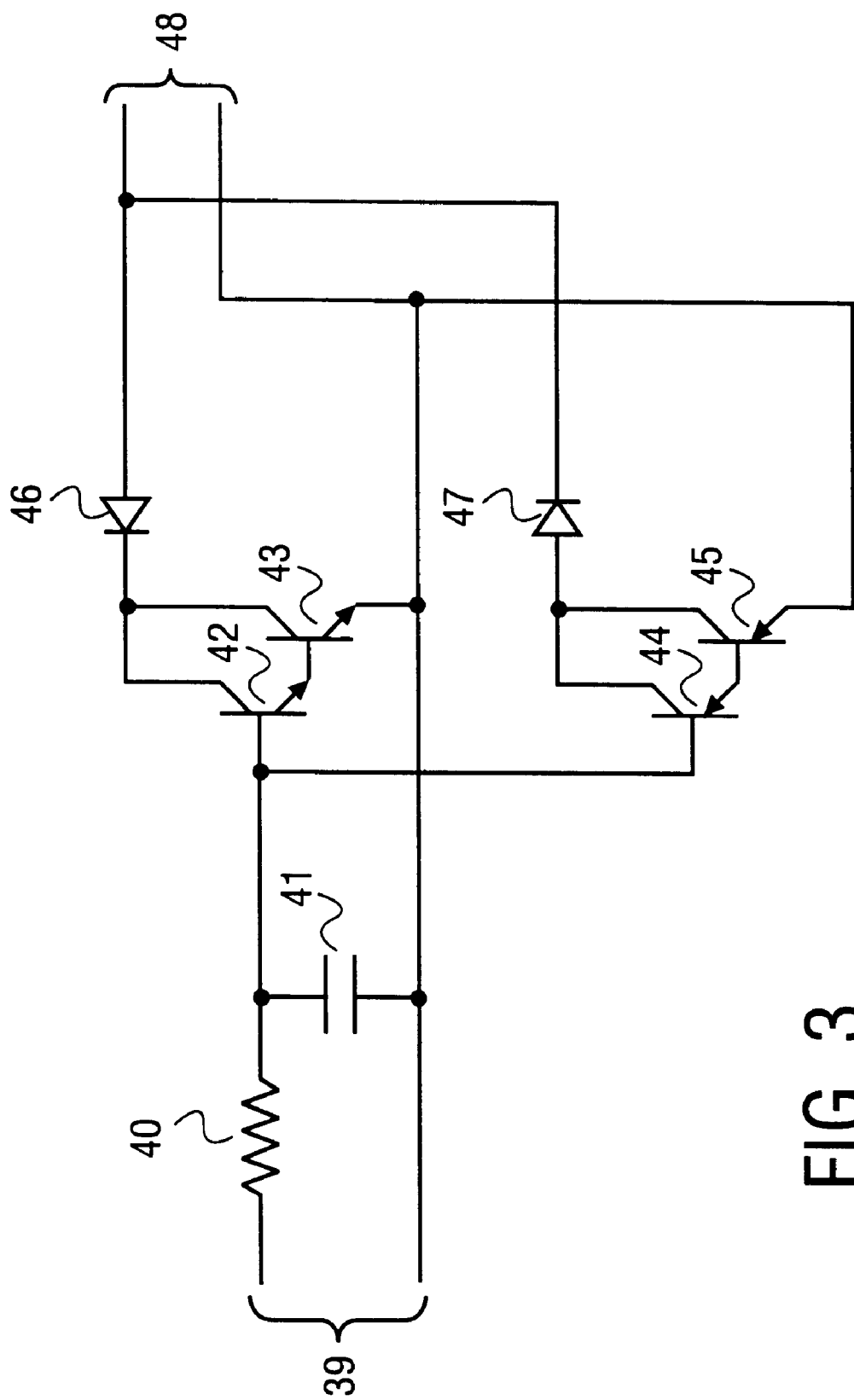
FIG. 3 is an electrical schematic for an alternate discharging circuit that may be used in the circuit of FIG. 1.

In FIG. 3, an alternate embodiment of the discharging circuit is shown. An attenuation circuit is also shown comprising the resistor 40 and capacitor 41. The leads 39 are coupled to the filtering capacitor, such as capacitor 10 of FIG. 1. In this embodiment, instead of using the Diac and triac, a biopolar transistor circuit, which includes two diodes is used. The NPN transistors 42 and 43 connected in a Darlington configuration, are coupled to one of the leads 39. The pair of PNP transistors 44 and 45, also in a Darlington configuration, are coupled to the same one of the leads 39. The Darlington pairs are used since they provide a relatively high input impedance. A diode 46 is connected to the collectors of the transistors 42 and 43, and the diode 47 is connected to the collectors of transistors 44 and 45. The diodes 46 and 47 on leads 48 can be connected to the discharging resistor, such as the 100 ohm resistor of FIG. 1, or may be directly connected to the capacitor 10 for discharging the capacitor.

The values of the resistor 40 and capacitor 41 are selected so that the potential on the base of transistors 42 and 44 remains low enough to prevent the transistors from conducting when an AC signal is applied to the lines 39. However, with a DC signal, greater than the threshold voltage of the transistors Darlington pairs, one of the Darlington pairs will conduct depending upon the polarity of the DC potential on leads 39. Once one of the Darlington pairs begins to conduct the capacitor 10 of FIG. 1 is quickly discharged through the collectors of the conducting pair. The diodes 46 and 47 prevent, for instance, conduction through the transistors 42 and 43, when a negative potential from capacitor 10 is applied to the capacitor 46 when the AC potential is present on leads 48. Similarly, the diode 47 prevents conduction through transistors 44 and 45 for the opposite polarity condition.

Figure 4:
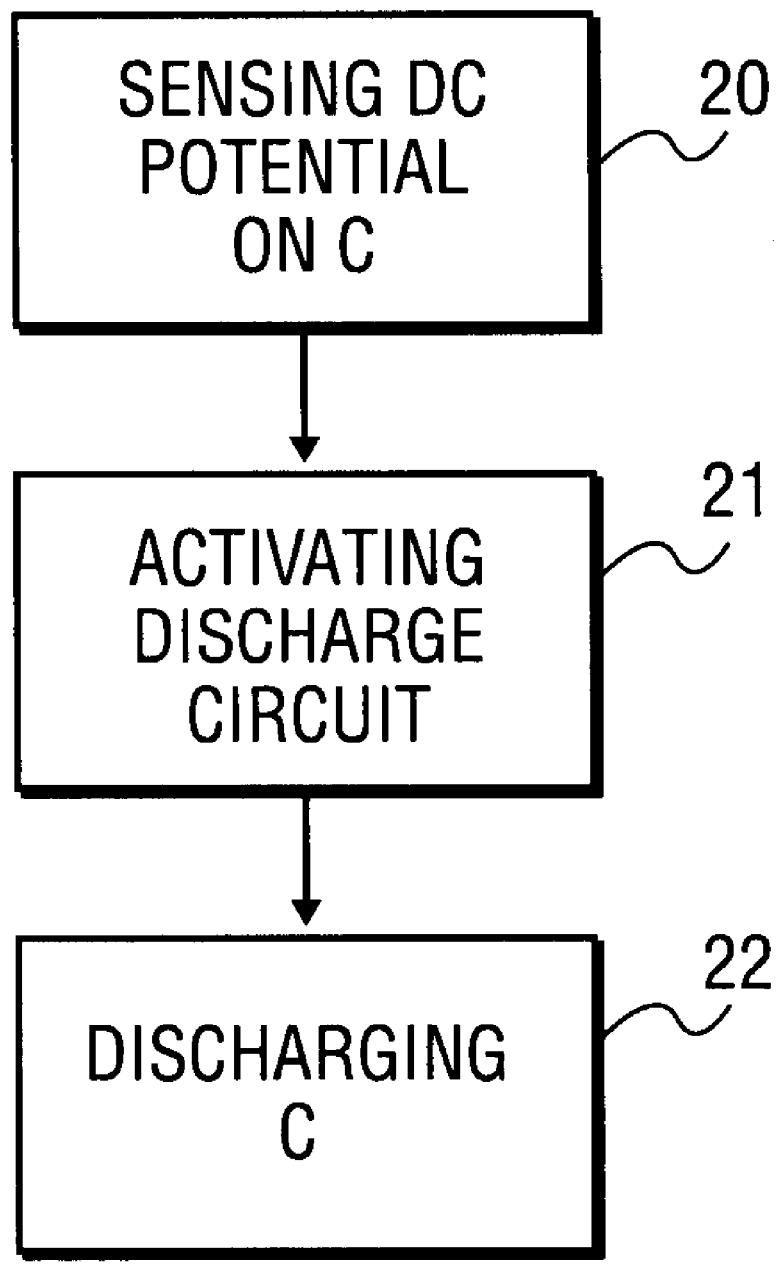
FIG. 4 describes the steps implemented by the circuit of FIG. 1.

FIG. 4 illustrates the method used by the present invention. Step 20 is the sensing of the DC potential on the filtering capacitor. Step 21 is the activation of a discharge circuit. This occurs when the DC potential on the filtering capacitor reaches or exceeds a predetermined threshold voltage such as 30V for the embodiment of FIG. 1. Note as mentioned earlier, the voltages on capacitors 10 and 11 are equal once capacitor 12 is charged. Finally step 22 is the discharging of the filtering capacitor. This is done by shorting or placing a resistor having relatively low resistance across the capacitor.

Thus, a circuit and method has been described which allows a capacitor to be coupled to an AC line with an ordinary plug and to be automatically discharged when the plug is removed from a socket.

What is claimed:

1. An electrical circuit for discharging a first capacitor when the first capacitor is disconnected from an AC source comprising:

an attenuation circuit for providing attenuation to an AC signal and substantially less attenuation to a DC signal, the attenuation circuit being coupled to the first capacitor; and a discharging circuit for discharging the first capacitor in response to the DC signal from the attenuation circuit.

2. The electrical circuit defined by claim 1 wherein the discharging circuit discharges the first capacitor when the DC signal reaches or exceed a positive or negative predetermined voltage.

3. The electrical circuit defined by claim 1 wherein the attenuation circuit comprises a first resistor and a second capacitor.

4. The electrical circuit defined by claim 1, 2 or 3 wherein the discharging circuit comprises a Diac coupled between the attenuation circuit and a control line of a triac and a second resistor coupled in series with the triac and first capacitor.

5. The electrical circuit defined by claim 1, 2 or 3 wherein the discharging circuit includes two pairs of transistors each in a Darlington configuration.

6. An apparatus for removing high frequency signals from an AC power line comprising:

a first capacitor for coupling across the AC power line;

an attenuation circuit for providing attenuation to an AC signal and substantial less attenuation to a DC signal, the attenuation circuit being coupled to the first capacitor; and a discharging circuit for discharging the first capacitor in response to the DC signal from the attenuation circuit.

7. The apparatus defined by claim 6 wherein the discharging circuit discharges the first capacitor when the DC signal reaches or exceed a positive or negative predetermined voltage.

8. The apparatus defined by claim 6 wherein the attenuation circuit comprises a first resistor and a second capacitor.

9. The apparatus defined by claim 6, 7, or 8 wherein the discharging circuit comprises a Diac coupled between the attenuation circuit and a control line of a triac and a second resistor coupled in series with the triac and first capacitor.

10. The apparatus defined by claim 6, 7 or 8 wherein the discharging circuit includes two pairs of transistors each in a Darlington configuration.

11. An electrical circuit for discharging a first capacitor comprising:

a resistor and a second capacitor coupled to the first capacitor;

a Diac coupled to a common junction between the first resistor and the second capacitor;

a triac having a control lead coupled to the diodes;

a second resistor coupled to the triac and first capacitor so as to discharge the first capacitor when the triac conducts, the triac conducting when the first capacitor is disconnected from an AC source.

12. A method for discharging a capacitor when the capacitor is disconnected from an AC power source comprising:

sensing the DC potential on the capacitor, and activating a discharge circuit when the DC potential exceeds a predetermined value.

* * * * *